United States Patent
Groux et al.

(10) Patent No.: US 6,228,412 B1
(45) Date of Patent: *May 8, 2001

(54) MONO-SCREW EXTRUSION PROCESS FOR MANUFACTURING AERATED FROZEN PRODUCTS

(75) Inventors: Michel John A. Groux, Laperswil; Gilles Fayard, Epalinges, both of (CH)

(73) Assignee: Nestec S.A., Vevey (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/983,491
(22) PCT Filed: May 12, 1997
(86) PCT No.: PCT/EP97/02593
  § 371 Date: Apr. 6, 1998
  § 102(e) Date: Apr. 6, 1998
(87) PCT Pub. No.: WO97/46114
  PCT Pub. Date: Dec. 11, 1997

(30) Foreign Application Priority Data

May 21, 1996 (EP) .................................................. 96201351

(51) Int. Cl.[7] .................................. A23G 9/04; A23G 9/20
(52) U.S. Cl. .................. 426/516; 426/524; 426/565; 426/566; 426/567; 62/306; 62/342; 62/343
(58) Field of Search ................................... 426/516, 524, 426/101, 565, 566, 517, 249, 100; 62/306, 342, 343, 806; 366/149; 425/204

(56) References Cited

U.S. PATENT DOCUMENTS

| 1,973,190 | * | 9/1934 | Westfield ............................. 259/10 |
| 2,000,730 | * | 5/1935 | Wortmann ............................ 62/114 |
| 2,131,510 | * | 9/1938 | Gray et al. ............................ 62/114 |
| 2,402,931 | * | 6/1946 | Thomas ................................ 62/114 |

(List continued on next page.)

FOREIGN PATENT DOCUMENTS

| 25 38 858 | * | 3/1977 | (DE) . |
| 0 559 316 A1 | * | 9/1993 | (EP) . |
| 0561118 | | 9/1993 | (EP) ................. A23P/1/16 |
| 0561 118 A3 | * | 3/1995 | (EP) . |
| 0713 650 A1 | * | 5/1996 | (EP) . |
| 56-029962 | * | 3/1981 | (JP) . |
| WO 97/39637 | * | 10/1997 | (WO) . |

OTHER PUBLICATIONS

Harper, "Extrusion of Foods", vol. 1 pp. 5–19, 52, 58–60, 66, 1981.*

Mercier et al, "Extrusion Cooking" pp. 1–11, 91–96, 1989.*

Primary Examiner—Cynthia L. Nessler
(74) Attorney, Agent, or Firm—Vogt & O'Donnell, LLP

(57) ABSTRACT

Frozen aerated compositions are prepared by introducing an unfrozen composition suitable for being frozen for preparing a frozen aerated composition into the barrel of an extrusion apparatus containing a single screw and rotating the screw for transporting the composition through the apparatus to and then through an extrusion exit die and for during transport of the composition through the extrusion apparatus, mixing, shearing and compressing the composition. Additionally during the transport of the composition through the apparatus, the composition is cooled and air is injected into composition to obtain from the die a compressed, aerated, cooled composition which has a temperature of equal to or lower than −8° C.

12 Claims, 1 Drawing Sheet

U.S. PATENT DOCUMENTS

Figure 1:
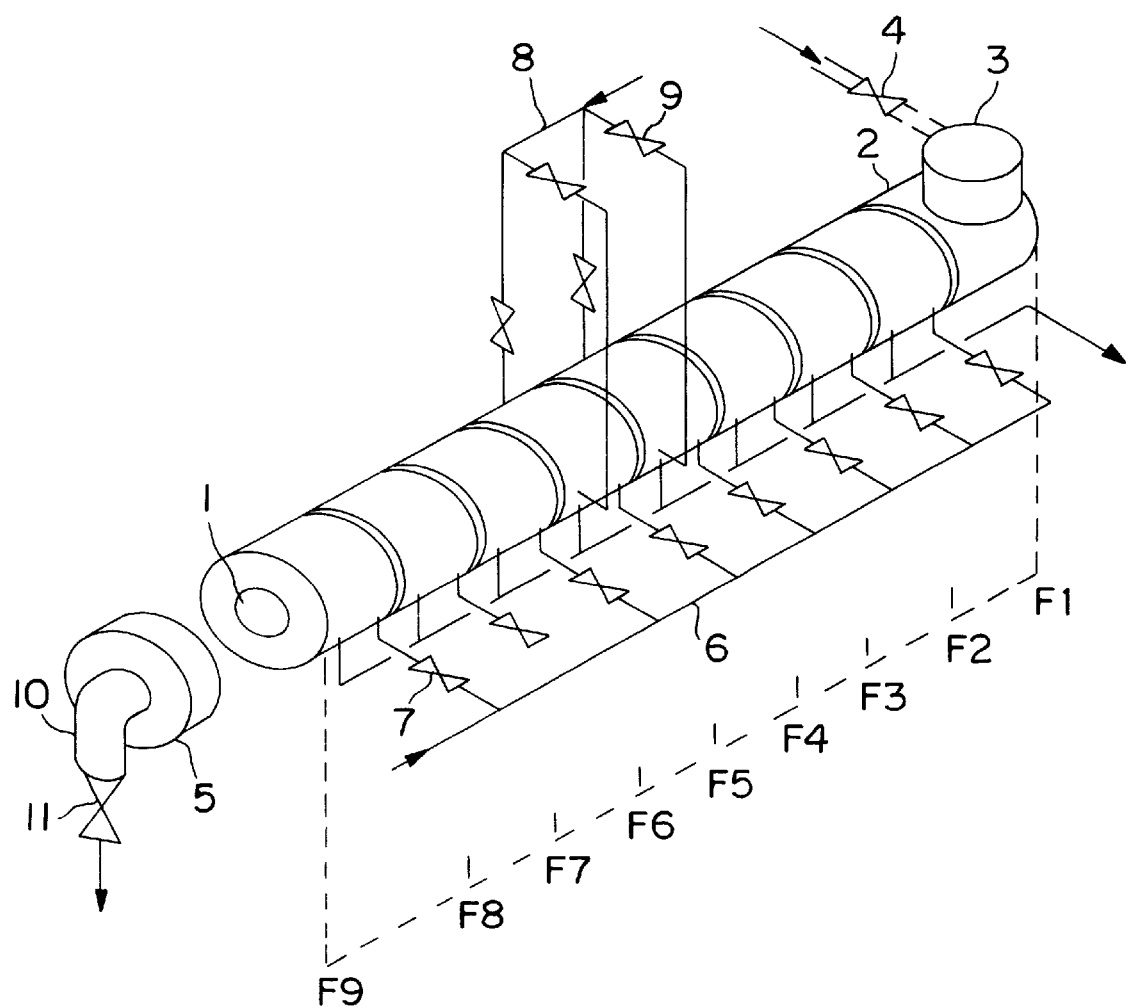

| | | | |
|---|---|---|---|
| 2,713,253 | * | 7/1955 | Chandler ................................ 62/114 |
| 2,827,773 | * | 3/1958 | Detjen ..................................... 62/2 |
| 2,909,433 | * | 10/1959 | Morrison ............................ 426/524 |
| 3,456,839 | * | 7/1969 | Glisenti ................................ 222/70 |
| 3,486,469 | * | 12/1969 | Recas .................................. 426/524 |
| 4,542,035 | | 9/1985 | Huang et al. ....................... 426/565 |
| 4,713,256 | | 12/1987 | Chaveron et al. .................. 426/631 |
| 4,758,097 | * | 7/1988 | Iles, Sr. ............................... 366/149 |
| 5,024,066 | | 6/1991 | Goavec ................................. 62/306 |
| 5,079,012 | * | 1/1992 | Lengerich et al. ..................... 426/72 |
| 5,112,626 | | 5/1992 | Huang et al. .......................... 426/43 |
| 5,175,013 | | 12/1992 | Huang et al. ....................... 426/565 |
| 5,345,781 | | 9/1994 | Fels et al. ............................. 62/343 |
| 5,403,611 | * | 4/1995 | Tomita et al. ...................... 426/565 |
| 5,439,695 | * | 8/1995 | Mackey ............................... 426/516 |
| 5,484,614 | * | 1/1996 | Clem ................................... 426/231 |
| 5,894,030 | * | 4/1999 | Gibson et al. ...................... 426/524 |

* cited by examiner

MONO-SCREW EXTRUSION PROCESS FOR MANUFACTURING AERATED FROZEN PRODUCTS

CROSS-REFERENCE TO RELATED PCT APPLICATION

This application is a national stage application of International Patent Application PCT/EP97/02593 filed May 12, 1997.

BACKGROUND OF THE INVENTION

The present invention relates to manufacture of frozen aerated products, particularly ice creams, and also to use of extrusion procedures.

A conventional process for manufacturing aerated frozen products, in particular ice cream, comprises the operations of blending, homogenizing, pasteurizing, freezing and hardening the mixture to be frozen. Aeration of the mixture or expansion is carried out during the freezing step in a proportion such that the volume increases by 70 to 120%. On leaving the freezer, the temperature of the aerated mass is typically −5 to −6° C. The mass is then hardened at −40 to −45° C. in a hardening chamber until the temperature of the product reaches −18° C. or lower at the core for bulk products or −30° C. for products extruded as bars.

An attempt has been made to reduce the temperature of the mass leaving the freezer for reasons of energy saving and with the object of improving the texture, for example in the direction of improved oiliness. Insurmountable problems have however been encountered with conventional equipment with the high viscosity of the ice cream mass at temperatures below −7 to −8° C. These problems have been partially resolved by using two freezers with a scraped surface in series, the first being a conventional one delivering aerated ice cream at approximately −7° C., and the second being specially designed to treat the highly viscous material to lower its temperature to approximately −10° C.

Within the same type of ideas, European Patent Application Publication No. 0 561 118 describes a three-step process for producing ice cream at a low temperature, down to −20° C., which is an exit temperature so that a hardening step may be entirely dispensed with for bulk products and considerably be shortened for extruded products. Further, in a first step, a so-called pre-expansion step, air is incorporated into the mixture to be frozen at a positive temperature. In a second step, the aerated mass is cooled in a scraped surface exchanger and leaves at approximately −6° C. During the third step, a screw device cools the mass to approximately −20° C.

U.S. Pat. No. 5,024,066 also discloses a two-step system. Pre-expansion takes place in the first step during which air is added to the mass to be frozen at a positive temperature. In the second step the aerated mass is cooled by means of an archimedean screw with a rough surface provided with scraping knives at its periphery, to a negative temperature sufficiently low to ensure a stable texture of the frozen mass, which enables the products to be stored directly in a cold chamber.

SUMMARY OF THE INVENTION

The object of the present invention is to carry out expansion and cooling operations on the mass in a single step in a single apparatus, which is easier to control and is less bulky than known devices, as well as to simplify the freezing process at a low temperature while deriving the previously mentioned advantages regarding energy and texture and it has been found surprisingly that it is possible to aerate and mix and cool a composition to be frozen in a single step with a mono-screw extrusion apparatus (an extrusion apparatus having only a single screw which extends longitudinally within a barrel for processing material, such as described further below by the drawing Figure description) so that, at a low temperature, a frozen aerated product having an improved and stable texture is extruded, when it would have been feared that the texture of the frozen composition would be damaged during treatment in a mono-screw extrusion apparatus.

The invention concerns a process for manufacturing aerated frozen products, wherein an unfrozen composition suitable for being aerated and frozen for preparing a frozen aerated composition is mixed, aerated, frozen and cooled to a temperature lower than or equal to −8° C. and is passed through a die, characterized in that the operations take place in a single step in a single mono-screw extrusion apparatus situated in a barrel provided with means for aeration and cooling.

DETAILED DESCRIPTION OF THE INVENTION

In order to put the process of the present invention into practice, there is prepared in a conventional manner a composition for ice cream, low-fat ice cream or sorbet, based, according to the recipe, on milk, skimmed milk, cream, concentrated milk, powdered milk or butter oil, to which are added sucrose, glucose, fruit dextrose, fruit pulp and stabilizing hydrocolloids such as, for example, carragheenates, alginates, carob gum, emulsifiers such as, for example, partial glycerides and flavourings. After intimately mixing the ingredients in the proportions dictated by the recipe, the mixture is pasteurized, cooled and then may optionally be homogenized, preferably hot, under stringent conditions enabling the mean size of the fat globules to be reduced to around 8–20 microns. After cooling and homogenizing at a low temperature, close to 0° C., the composition may be allowed to ripen for a certain length of time at that temperature. Homogenization and maturing are optional steps.

This composition, optionally homogenized and ripened, is introduced, preferably at approximately 2–7° C. into a mono-screw apparatus which is described below in greater detail, in which it is conveyed to an air injection zone where it is expanded to 0–150%, strongly cooled to −8 to −20° C., and then forced through a die.

Work in the mono-screw apparatus is carried out surprisingly without excessive shear, so that the increase in pressure does not exceed approximately 50 bar in the region of the die, and the screw may be revolved at 100 to 600 rpm. The emerging product is characterized by a mean ice crystal diameter of 10 to 30 microns, which is appreciably less than that which can be obtained with conventional freezers. The result is an improved texture in the sense of better oiliness and better creaminess.

Thus, the present invention also provides an apparatus for putting the process into practice, comprising an endless screw, placed in a barrel provided at one of its ends with an extrusion die and at the other end with means for feeding the composition to be frozen and, in an intermediate zone, means for feeding in air, the barrel being provided with a sleeve through which cooling fluids flow.

The endless screw may have successive segments where its form varies from one segment to another, from the point of view of the orientation of the threads and their pitch. The configuration of the screw is chosen so as to carry out operations for transporting, mixing, shearing and compressing the mass through the die and to encourage, optionally, the incorporation of gas so as to obtain good expansion. Zones can be provided for mixing, for example by monolobe or bi-lobe discs with a positive orientation, having a transporting effect or with a negative orientation having a return effect, or by a segment with an inverse screw pitch inducing a return.

The barrel is provided with means for cooling consisting of a jacket with, preferably, one self-contained cooling circuit per segment, with valves controlling the flow rate of cooling agent which enables the temperature of each segment to be regulated individually. The screw may also have an internal cooling circuit.

Air may be injected by means of flow meters through pipes at different regions of the barrel, preferably in the second half of its length, preferably from either side thereof. In this way, it is possible to achieve 0 to 150% and preferably 30 to 120% expansion.

The die may have a horizontal or vertical outlet. The geometry and dimensions of the die or, as the case may be, the diameter and length of the outlet pipe which may be associated therewith are designed to ensure a counter-pressure of the order of 4 to 50 bar and preferably 4 to 25 bar. The counter-pressure may be regulated by means, for example, of a ball valve downstream from the pipe in question, for example in the case of an outlet temperature for the product close to the lower limit, in which case the diameter of the outlet pipe should be increased to compensate for the fall in pressure due to the loss of charge caused by the increase in viscosity when the temperature of the mass falls. The die may preferably be cooled, for example by means of a sleeve through which a cooling fluid flows.

The apparatus according to the invention is described below in greater detail with reference to the accompanying drawing Figure given by way of example.

BRIEF DESCRIPTION OF THE DRAWING FIGURE

The drawing FIG. 1 is an exploded diagrammatic view in perspective of the apparatus of the present invention for putting into practice the process of the present invention.

DETAILED DESCRIPTION OF THE DRAWING FIGURE

As will be seen in the accompanying FIGURE, an apparatus for carrying out the process of the present invention comprises an extrusion screw 1, which can move in rotation about its axis and is driven by a motor (not shown). The screw is mounted in a barrel (2) which has, at its beginning, a pipe 3 for feeding a composition to be frozen provided with a non-return valve 4 for ensuring air tightness and which ends in a die 5 in the form of a plate.

The barrel comprises nine segments, designated in the drawing FIGURE as F1 to F9, 100 mm in length, which are modulable from the point of view of the configuration of the screw with which are associated individual cooling circuits 6 corresponding to the sleeves through which a water-alcohol mixture flows, with individual flow rate regulation by means of the valves 7. Aeration takes place through the air inlet 8, on either side of the barrel, and air is injected by a piston provided with a mass flow meter. The air flow rate is regulated individually by the valves 9.

In a variant (not shown) the die 5 is provided with a sleeve through which a cooling fluid also flows, and the flow rate may be regulated individually.

A pipe 10 at the end of the outlet from the barrel 2 and the die 5, acts as a pre-expansion zone. The pipe 10 is provided with a ball valve 11 for controlling the counter-pressure and the dwell time of the mass in the barrel.

If L is the total length of the segments of the screw which represent the active length of this screw and D is its diameter, the ratio L/D is of the order of 30 to 60.

EXAMPLES

The process according to the invention is described in greater detail in the following Examples given by way of illustration. Percentages and parts are by weight, except where indicated to the contrary.

Example 1

A composition to be frozen was prepared having a low freezing point containing 8.5% of milk fats (in the form of cream with 35% fats), 11% of non-fat milk solids, 12% sucrose, 6.4% glucose syrup (dextrose equivalent 40), 1% dextrose, 0.47% partial glycerides as stabilizers/emulsifiers and 0.4% of vanilla flavouring. The total solids content of the composition was 39.15% the remainder being represented by water. The mixture was subjected to homogenization in two steps at 135 bar, and then 35 bar, and was pasteurized at 86° C. for 30 s, cooled to 4° C. and stored 24 h at this temperature. This composition was introduced into a mono-screw apparatus under the operating conditions given below:

Configuration of screw

| Segments | F1 | F2 | F3 | F4 | F5 | F6 | F7 | F8 | F9 |
|---|---|---|---|---|---|---|---|---|---|
| Type of screw | T | T/M | T/M | M/C | T | CO | M/CO | M/CO | CO |

Where T: Transport,
M: Mixing,
C: Shear and
CO: Compression

Flow rate of product entering 8 kg/h, at 6° C.

Air injection: in 9 from both sides in F5 and F6, i.e. through 4 pipes with a flow rate of 15 g/h.

Rate of rotation of screws: 300 rpm.

Cooling of zones F2 to F9 with a cooling fluid at −26° C. (inlet temperature)/−24.4° C. (outlet temperature), at a flow rate of 17 litres/min.

Diameter of outlet die: 12 mm.

The outlet temperature of the product was −10.4° C. and expansion was 40%.

The products obtained had an oilier and creamier texture than products manufactured in a conventional manner as a reference.

The mean ice crystal diameter measured by optical microscopy at −10° C. and at a magnification of 1000–1500 (Dc, micron) was 30.25 microns.

Example 2

In this Example, compositions for a sorbet were prepared in the following manner: 29% of sugar, 10% of glucose syrup and 35% unsweetened raspberry puree, a colorant and a raspberry flavouring were added to a mixture of 0.8% stabilizers (gelatine, carob gum) at 60° C., as well as a food quality acid to give a pH of 3.2–3.4. The solids content of the composition was 30.30%, the rest being represented by water. The mixture was homogenized at 72° C. in one step at a pressure of 50 bar, and was then pasteurized at 85° C. for 30 min, cooled to 4° C. and allowed to stand for at least 4 h at this temperature.

This composition to be frozen was introduced into the mono-screw apparatus Example 1. The operating conditions were the same as in Example 1, except for the following:

Air injection: in 9, from both sides in F5 and F6, i.e. through 4 pipes with a flow rate of 15 g/h.

The outlet temperature of the product was −10.4° C. and expansion was 40%.

In the preceding Examples, the process and the apparatus have been described with reference to the manufacture of a frozen composition without specifying that it is possible to treat, at the same time several ice creams or sorbets having different flavors and colors, by co-extrusion, and thus to obtain composite products, for example marbled products, optionally containing inclusions.

The process is of course applicable to the manufacture of frozen products of the mousse, cream and sweetened type or salted spreading paste type, for example with cheese, vegetable,. meat or fish, or sauces or salad dressings. In these cases, the flexibility of the process makes it possible to adjust the amount of air incorporated in the composition to be frozen according to the varying degree of expansion desired in relation to the characteristics of the types of products aimed at.

What is claimed is:

1. A process for manufacturing a frozen aerated composition comprising (i) introducing an unfrozen composition suitable for being frozen for preparing a frozen aerated composition into of an extrusion apparatus which consists essentially of a barrel which is cooled and of a single screw which is contained in the barrel and configured for transporting, mixing, shearing and compressing the composition and of a product exit die and rotating the screw for (a) transporting the composition through the apparatus to and then through the exit die and for (b) during transport of the composition through the apparatus, mixing, shearing and compressing the composition and (ii) during the transport of the composition through the apparatus, cooling the composition and injecting air into the composition to obtain, from the exit die, a compressed, aerated, cooled composition which has a temperature of equal to or lower than −8° C.

2. A process according to claim 1 wherein the unfrozen composition introduced into the extrusion apparatus has a temperature of from approximately 2° C. to 7° C.

3. A process according to claim 1 or 2 wherein the composition in the extruder is cooled to a temperature of from −8° C. to −20° C. for transport through the die.

4. A process according to claim 1 wherein the transporting, mixing, shearing, compression and air injection are carried out so that pressure in the extrusion apparatus does not exceed approximately 50 bar.

5. A process according to claim 1 wherein the transporting, mixing, shearing, compression and air injection are carried out so that the pressure in the extrusion apparatus is on an order of from 4 bar to 50 bar.

6. A process according to claim 1 wherein the transporting, mixing, shearing, compression and air injection are carried out so that the pressure in the extrusion apparatus is on an order of from 4 bar to 25 bar.

7. A process according to claim 1 or 4 or 5 or 6 wherein the screw is revolved at a rate of from 100 rpm to 600 rpm.

8. A process according to claim 1 wherein the air is injected in a zone of the extrusion apparatus at a position intermediate to a zone whereat the composition is introduced into the extrusion apparatus and to a zone prior to the die.

9. A process according to claim 1 wherein, after the introduction of the composition into the extrusion apparatus, the composition transported is mixed and then the air is injected and then the aerated composition is mixed and compressed.

10. A process according to claim 1 wherein the air is injected into the composition for expanding the composition in an amount of up to 150%.

11. A process according to claim 1 wherein temperatures of segments of the extrusion apparatus are regulated individually for the cooling and freezing.

12. A process according to claim 1 or 11 wherein the extrusion apparatus screw and barrel both are cooled.

* * * * *

UNITED STATES PATENT AND TRADEMARK OFFICE
CERTIFICATE OF CORRECTION

PATENT NO. : 6,228,412 B1
DATED : May 8, 2001
INVENTOR(S) : Michel John A. Groux, et al.

It is certified that error appears in the above-identified patent and that said Letters Patent is hereby corrected as shown below:

Column 1,
Line 48, (the line of "exchanger and ... ") delete "the" and insert therefor -- a --.

Column 2,
Line 26, (the line of "practice, ... ") insert a comma after <u>each</u> of "prepared" and "manner".

Column 3,
Line 43, delete "1".

Column 5,
Line 9, after "apparatus", insert -- of --.
Line 35, (text line 4 of claim 1), delete "of".

Signed and Sealed this

Second Day of April, 2002

Attest:

JAMES E. ROGAN
*Attesting Officer*     *Director of the United States Patent and Trademark Office*